(12) United States Patent
Goswami et al.

(10) Patent No.: US 7,896,953 B1
(45) Date of Patent: Mar. 1, 2011

(54) PRACTICAL METHOD OF $CO_2$ SEQUESTRATION

(75) Inventors: D. Yogi Goswami, Gainesville, FL (US); Man Su Lee, Houston, TX (US); Nikhil K. Kothurkar, Tampa, FL (US); Elias K. Stefanakos, Tampa, FL (US)

(73) Assignee: University of South Florida, Tampa, FL (US)

( * ) Notice: Subject to any disclaimer, the term of this patent is extended or adjusted under 35 U.S.C. 154(b) by 266 days.

(21) Appl. No.: 12/335,049

(22) Filed: Dec. 15, 2008

Related U.S. Application Data (60) Provisional application No. 61/013,844, filed on Dec. 14, 2007.

(51) Int. Cl.
*B01D 53/14* (2006.01)
*B01D 53/62* (2006.01)

(52) U.S. Cl. .............. 95/139; 95/148; 96/154; 252/184; 423/230

(58) Field of Classification Search .......... 96/134, 96/135, 153, 154; 95/139, 148; 252/184; 423/220, 230, 635, 637; 128/205.28; 55/523, 55/524, 527
See application file for complete search history.

(56) References Cited

U.S. PATENT DOCUMENTS

| | | | | |
|---|---|---|---|---|
| 3,865,924 A | * | 2/1975 | Gidaspow et al. | 423/230 |
| 4,493,715 A | * | 1/1985 | Hogan et al. | 95/139 |
| 5,250,094 A | * | 10/1993 | Chung et al. | 55/523 |
| 7,618,606 B2 | * | 11/2009 | Fan et al. | 423/230 |
| 2001/0054253 A1 | * | 12/2001 | Takahashi et al. | 47/63 |
| 2004/0200393 A1 | | 10/2004 | Zauderer | |
| 2006/0039853 A1 | | 2/2006 | Fan et al. | |
| 2007/0149392 A1 | * | 6/2007 | Ku et al. | 502/240 |

FOREIGN PATENT DOCUMENTS

WO 2007003954 A1 1/2007

* cited by examiner

*Primary Examiner*—Frank M Lawrence
(74) *Attorney, Agent, or Firm*—Robert Varkonyi; Smith & Hopen, P.A.

(57) ABSTRACT

A process and device to capture of $CO_2$ at its originating source, such as a power plant, is disclosed. Absorbent material is recharged by desorbing $CO_2$, so that it may be sequestered or used in another application. Continual recharging results in loss of absorbent surface area, due to pore plugging and sintering of particles. Calcium oxide or calcium hydroxide was immobilized to a fibrous ceramic-based fabric substrate as a thin film and sintered, creating an absorbent material. The samples were characterized, showing continuous cyclic carbonation conversions between about 62% and 75% under mild calcination conditions at 750° C. and no $CO_2$ in $N_2$. Under the more severe calcination condition at 850° C. and 20 wt % $CO_2$ in $N_2$, yttria fabric was superior to alumina as a substrate for carbon dioxide capture and the reactivity of the calcium oxide absorbent immobilized to yttria was maintained at the same level in the 12 cycles.

23 Claims, 10 Drawing Sheets

|  | Carbonation ||| Calcination |||
|---|---|---|---|---|---|---|
|  | Temperature | Gas feed | Duration | Temperature | Gas feed | Duration |
| Mild condition | 750°C | 20 vol. % of $CO_2$ in $N_2$ | 20 min | 750°C | Pure $N_2$ | 10 min |
| Severe condition | 700°C | 20 vol. % of $CO_2$ in $N_2$ | 30 min | Ramp 15°C/min from 700°C to 850°C | 20 vol. % of $CO_2$ in $N_2$ | 10 min |

PRACTICAL METHOD OF CO$_2$ SEQUESTRATION

CROSS REFERENCE TO RELATED APPLICATION

This application claims priority to U.S. Provisional Patent Application No. 61/013,844, entitled "Carbon Dioxide Sequestration", filed on Dec. 14, 2007, the contents of which are herein incorporated by reference.

GOVERNMENT INTEREST

This invention was made with Government support under Grant DE-FG36-04GO14224, awarded by the U.S. Department of Energy. The Government has certain rights in the invention.

FIELD OF INVENTION

This invention relates to methods of sequestering carbon dioxide. Specifically, the invention provides for a method of using immobilized calcium oxide or calcium hydroxide to sequester carbon dioxide.

BACKGROUND OF THE INVENTION

Since the Industrial Revolution in the 1700's, human activities, such as the burning of oil, coal and gas, and deforestation, have increased CO$_2$ concentrations in the atmosphere. In 2005, global atmospheric concentrations of CO$_2$ were 35% higher than they were before the Industrial Revolution. Conventional power plants are known as one of the largest sources of anthropogenic carbon dioxide emissions in the atmosphere. Additionally, several specialized industrial production processes, such as mineral or metal production and petroleum-based product generation, can also lead to CO$_2$ emissions.

Carbon dioxide is one of the major greenhouse gases and the cause of global warming. The emissions from fossil fuel power plants are one of the largest sources of anthropogenic carbon dioxide emissions in the atmosphere. The carbon dioxide from the power plants can be separated from the sources via the following carbon dioxide capture processes: post-combustion, pre-combustion and oxyfuel combustion (Metz, B.; Davidson, O.; Coninck, H.; Loos, M.; Meyer, L. (Eds.) IPCC special report on carbon dioxide capture and storage. Cambridge University Press 2005). Among them, the pre-combustion process is considered as a feasible way to capture carbon dioxide in the clean coal gasification process or steam methane reforming (SMR) to produce hydrogen or electricity.

Sequestration of CO$_2$ is becoming important for combating global climate change. Developed and developing countries are increasingly committed to reducing CO$_2$ levels. To achieve CO$_2$ target levels, these countries will have to enforce CO$_2$ sequestration from concentrated CO$_2$ sources, such as coal power plants.

Carbon dioxide in the flue gases from power plants can be captured by techniques such as absorption, adsorption, or reaction-based processes. Of all the methods, the calcium oxide based reaction process for carbon dioxide capture from the effluent gas (Shimizu, T.; Hirama, T.; Hosoda, H.; Kitano, K.; Inagaki, M.; Tejima, K. A twin fluid-bed reactor for removal of CO2 from combustion processes. Trans. IChemE 1999, 77 (Part A), 62-68) looks very promising considering the operating temperature and pressure, capture capacity, the low carbon dioxide concentration (5-30%) in the effluent, and regeneration of pure carbon dioxide through the calcination reaction (Gupta, H.; Fan, L-S. Carbonation-calcination cycle using high reactivity calcium oxide for carbon dioxide separation from flue gas. Ind. Eng. Chem. Res. 2002, 41, 4035-4042).

Calcium oxide is an effective carbon dioxide absorbent, but the cyclic lifetime and durability of the absorbent are key issues for its practicability. Pore plugging and sintering of particles have been identified as the major causes of the degradation of the absorption capacity in cyclic operation. The carbonation between calcium oxide and carbon dioxide and calcination reactions are described as follows:

Carbonation:

$$CaO(s) + CO_2(g) \rightarrow CaCO_3(s), H_{973K} = -169.7 \text{ kJ/mol} \quad \text{(exothermic)} \quad (1)$$

Calcination:

$$CaCO_3(s) \rightarrow CaO(s) + CO_2(g), H_{1173K} = 166.3 \text{ kJ/mol} \quad \text{(endothermic)} \quad (2)$$

Carbon dioxide reacts with calcium oxide to form calcium carbonate in the carbonation reaction and the calcium oxide is regenerated and pure carbon dioxide can be obtained through the calcination reaction. This calcium oxide absorbent has been investigated to improve the process efficiency as well as trap the carbon dioxide in biomass or coal gasification process (Mahishi, M. R.; Goswami, D. Y. An experimental study of hydrogen production by gasification of biomass in the presence of a CO$_2$ sorbent. International Journal of Hydrogen Energy 2007, 32, 2803-2908; Xu, G.; et al. Distinctive effects of CaO additive on atmospheric gasification of biomass at different temperatures Ind. Eng. Chem. Res. 2005, 44, 5864-5868; Hanaoka, T.; et al. Hydrogen production from woody biomass by steam gasification using a CO$_2$ sorbent. Biomass and Bioenergy 2005, 28, 63-68; Lin, S.; et al.; Hydrogen production from coal by separating carbon dioxide during gasification. Fuel 2002, 81, 2079-2085; Feng, B.; et al. Screening of CO$_2$ adsorbing materials for zero emission power generation systems. Energy & Fuels 2007, 21, 426-434; Slowinski, G. Some technical issues of zero-emission coal technology. International Journal of Hydrogen Energy 2006, 31, 1091-1102; Feng, B.; et al. Overcoming the problem of loss-in-capacity of calcium oxide in CO$_2$ capture. Energy & Fuels 2006, 20, 2417-2420). It was reported that the hydrogen yield from pyrolysis of the mixture of coal and calcium oxide, compared to conventional coal pyrolysis, was more than five times (Lin, S.; et al.; Hydrogen production from coal by separating carbon dioxide during gasification. Fuel 2002, 81, 2079-2085).

However, substantial volume changes between carbonate (36.9 cm$^3$/mol) and oxide forms (16.9 cm$^3$/mol) are induced by these gas-solid reactions (Stanmore, B. R.; Gilot, P. Review-calcination and carbonation of limestone during thermal cycling for CO$_2$ sequestration. Fuel Processing Technology 2005, 86, 1707-1743). These structural and thermal stresses caused by the cyclic carbonation-calcination reaction lead to the loss in active surface area, pore plugging and sintering of the particles in the absorbent. The degradation of the CO$_2$ absorption capacity during the cyclic operation of the absorbent (calcium oxide), which is caused by the loss in surface area due to pore plugging and sintering of particles, must be overcome for the process to be practical (Barker, R. The reversibility of the reaction CaCO3=CaO+CO2. J. Appl. Chem. Biotechnol 1973, 23, 733-742; Borgwardt, R. H. Calcium oxide sintering in atmospheres containing water and carbon dioxide. Ind. Eng. Chem. Res. 1989, 28, 493-500). Various forms of calcium oxide have been investigated to improve the durability of cyclic performance for capturing carbon dioxide, such as dolomite ($CaCO_3 \cdot MgCO_3$) (Curran, G. P.; et al. Carbon dioxide-acceptor gasification process: studies of acceptor properties. Adv. Chem. Ser. 1967, 69, 141-165; Dobner, S.; et al. Cyclic calcinations and recarbonation of calcined dolomite. Ind. Eng. Chem., Process Des. Dev. 1977, 16, 479-486; Silaban, A.; et al. Characteristics of the reversible reaction between $CO_2(g)$ and calcined dolomite. Chem. Eng. Comm 1996, 146, 149-162), calcium oxide dispersed in porous inert calcium titanate ($CaTiO_3$) matrix (Aihara, M.; et al. Development of porous solid reactant for thermal-energy storage and temperature upgrade using carbonation/decarbonation reaction. Applied Energy 2001, 69, 225-238), impregnated in porous alumina granules (Feng, B.; et al. Overcoming the problem of loss-in-capacity of calcium oxide in $CO_2$ capture. Energy & Fuels 2006, 20, 2417-2420), or mixed with mayenite ($Ca_{12}Al_{14}O_{33}$) (Li, Z.-S.; et al. Synthesis, experimental studies, and analysis of a new calcium-based carbon dioxide absorbent. Energy & Fuels 2005, 19, 1447-1452; Li, Z.-S.; et al. Effect of preparation temperature on cyclic $CO_2$ capture and multiple carbonation-calcination cycles for a new ca-based $CO_2$ sorbent. Ind. Eng. Chem. Res. 2006, 45, 1911-1917) or nano-sized alumina ($Al_2O_3$) particles (Wu, S. F.; et al. Properties of a nano $CaO/Al_2O_3CO_2$ sorbent. Ind. Eng. Chem. Res. 2008, 47, 180-184), and core-in-shell catalysis/sorbent (Satrio, J. A.; et al. Application of combined catalyst/sorbent on hydrogen generation from biomass gasification. AIChE Annual Meeting Conference Proceedings, Nov. 7-12, 2004, Austin, Tex.; Satrio, J. A.; et al. Development of a novel combined catalyst and sorbent for hydrocarbon reforming. Ind. Eng. Chem. Res. 2005, 44, 3901-3911; Satrio, J. A.; et al. A combined catalysis and sorbent for enhancing hydrogen production from coal or biomass. Energy & Fuels 2007, 21, 322-326) have been introduced and investigated to improve the cyclic performance of the absorbents for carbon dioxide capture. Most of these attempts showed better cyclic performance than pure calcium oxide thanks to the inert materials, but those bring other drawbacks, complexity in preparation, high cost for the synthesis and low content of calcium oxide in inert materials.

Conventional steam methane reforming (SMR) can be enhanced via in situ carbon dioxide capture using sorbents. The process is known as sorption-enhanced steam methane reforming process (SE-SMR). Hydrogen yield was increased along with carbon dioxide capture through the carbonation reaction (3) since the equilibrium shifts to the right by removing carbon dioxide by the calcium oxide based sorbents in a water-gas shift reaction shown below (Han, C.; Harrison, D. P. Simultaneous shift and carbon dioxide separation for the direct production of hydrogen. Chem. Eng. Sci. 1994, 49, 5875-5883; Balasubramanian, B.; Ortiz, A. L.; Kaytakoglu, S.; Harrison, D. P. Hydrogen from methane in a single-step process. Chem. Eng. Sci. 1999, 54, 3543-3552; Li, Z.-S.; Cai, N.-S.; Yang, J.-B. Continuous production of hydrogen from sorption-enhanced steam methane reforming in two parallel fixed-bed reactors operated in a cyclic manner. Ind. Eng. Chem. Res. 2006, 45, 8788-8793). The conventional coal gasification process and steam methane reforming consists of the following a reformation and a water-gas shift reaction reformation (coal gasification: x=0, y=1, SMR: x=4, y=3) water-gas shift reaction In addition to its use in carbon dioxide capture for biomass or coal gasification process, calcium oxide has also been considered as a feasible candidate for efficiency improvement (Feng, B.; et al. Screening of CO2 adsorbing materials for zero emission power generation systems. Energy & Fuels 2007, 21, 426-434; Hanaoka, T.; et al. Hydrogen production from woody biomass by steam gasification using a CO2 sorbent. Biomass and Bioenergy 2005, 28, 63-68). Hydrogen yield from these processes can be increased significantly using absorbents to react with or absorb carbon dioxide during gasification since the forward equilibrium shift would occur by removing carbon dioxide in a water-gas shift reaction (Mahishi, M. R.; Goswami, D. Y. An experimental study of hydrogen production by gasification of biomass in the presence of a CO2 sorbent. International Journal of Hydrogen Energy 2007, 32, 2803-2908; Balasubramanian, B.; et al. Hydrogen from methane in a single-step process. Chem Eng Sci 1999, 54, 3543-3552; Lin, S.-Y.; et al. Developing an innovative method, HyPr-RING, to produce hydrogen from hydrocarbons. Energy Conservation and Management 2002, 43, 1283-1290). Various absorbents has been introduced and studied, but calcium oxide based absorbents seem very promising in consideration of operating temperature, pressure and capture capacity (Gupta, H.; Fan, L. Carbonation-calcination cycle using high reactivity calcium oxide for carbon dioxide separation from flue gas. Ind. Eng. Chem. Res. 2002, 41, 4035-4042). The zero-emission coal (ZEC) process using calcium oxide for carbon dioxide capture also had higher hydrogen yield. The process is very attractive in that electricity can be generated with high efficiency and without emission of carbon dioxide assuming cyclic stability of the CaO/CaCO3 bed (Slowinski, G. Some technical issues of zero-emission coal technology. International Journal of Hydrogen Energy 2006, 31, 1091-1102).

Compounds such as calcium oxide or calcium hydroxide have been considered as promising candidates for carbon sequestration, absorbing carbon dioxide to form calcium carbonate. The original compounds can be regenerated by desorbing carbon dioxide under the proper conditions. However, one key problem relates to large volume changes during the carbonation/decarbonation reactions. This problem potentially severely limits the cyclic repeatability of this process. The published literature currently shows no more than one or two cycles can be completed before capacity is reduced drastically. To create a practical calcium oxide or calcium hydroxide scrubber, the degradation of the absorption capacity in cyclic operation, caused by pore plugging and sintering of particles, must be addressed.

SUMMARY OF THE INVENTION

A simple and cost effective immobilization procedure is disclosed binding nano-sized calcium oxide particles into a fibrous ceramic fabric which acts as a support of the calcium oxide absorbent to enhance its cyclic performance. The characteristics and cyclic performance of the proposed immobilized calcium oxide in the fabric were examined and compared with other results in the literature.

Disclosed is a method of immobilizing calcium oxide onto ceramic fiber. The calcium carbonate is first dissolved in ethyl alcohol and ultrasonicated to prevent agglomeration. In some embodiments, the dissolved calcium carbonate is ultrasonicated for 10 minutes. The resultant slurry is applied onto a ceramic fiber, dried and sintered. In specific embodiments, the slurry is dried at 100° C. for 30 minutes in air. Likewise, the slurry may be sintered at 800° C. for 12 hours in air. The calcium carbonate may further be dissolved in ethyl alcohol under mechanical stirring for 10 minutes.

The calcium carbonate used in the disclosed sequestration methods and devices may be precipitated calcium carbonate. In specific embodiments, the calcium carbonate is immobilized on ceramic fiber comprising either alumina ceramic fiber or yttria ceramic fiber.

The calcium carbonate may be treated with stearic acid prior to dissolving the calcium carbonate in ethyl alcohol. In specific embodiments, an additional impregnation occurs to increase the amount of calcium oxide available in the absorbent material by applying additional slurry calcium carbonate on the dried slurry-ceramic fiber before sintering and drying the additional slurry. The final slurry-ceramic mat may then be sintered.

Disclosed is a particulate sequestering material, made of an absorbing material of at least calcium oxide impregnated and sintered into a ceramic fiber. The absorbing material comprises calcium oxide amounts selected from the group consisting of 55 weight percent and 23 weight percent in specific embodiments. The calcium oxide may be impregnated onto alumina ceramic fiber or yttria ceramic fiber. In specific embodiments, the alumina ceramic fiber consists of alumina fibers with a diameter within the range of 2 to 5 μm. The ceramic fiber may allow the absorbing material to form interconnected microstructures of calcium oxide particles between the ceramic fibers. The absorbing material possesses a surface area within the range of 9.2 to 19 $m^2/g$ in certain embodiments.

A method of sequestering carbon dioxide is also disclosed. An absorbent material of at least calcium carbonate impregnated and sintered into a ceramic fiber is exposed to a gas comprising at least carbon dioxide, and specifically, without limitation, gases comprising 20% carbon dioxide and nitrogen. In some embodiments, the calcium carbonate is precipitated calcium carbonate.

The absorbent material may be exposed to the gas at between 700-750° C. and specifically, without limiting the disclosure, for between 20 minutes and 2 hours. Moreover, the absorbent material may be recycled by exposing the absorbent material to a recycling gas, comprising at least nitrogen, at between 700-850° C. In specific embodiments, the recycling gas is either 20% carbon dioxide in at least nitrogen or pure nitrogen. The recycling is performed for 5 minutes in specific embodiments.

BRIEF DESCRIPTION OF THE DRAWINGS

For a fuller understanding of the invention, reference should be made to the following detailed description, taken in connection with the accompanying drawings, in which:

FIGS. 2(a) and (b) are scanning electron microscope (SEM) images of (a) original alumina mat and (b) fresh sintered sample of the disclosed invention.

DETAILED DESCRIPTION OF THE PREFERRED EMBODIMENT

As used herein, an "yttria" is a compound composed of yttrium (III) oxide is $Y_2O_3$. Ceramic formulas using yttria possess a high melting point and low thermal expansion characteristics.

Experimental Procedures

Figure 1:
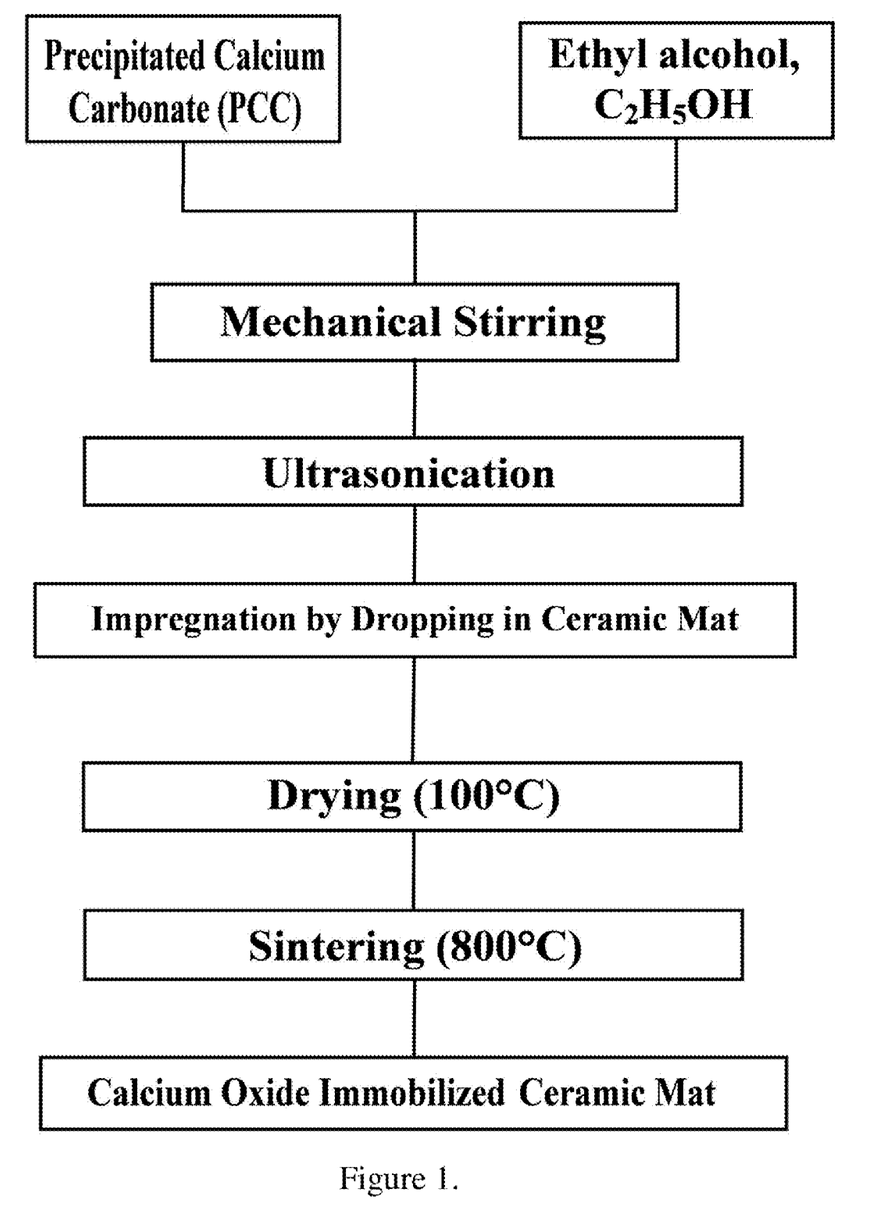
FIG. 1 is a diagram of the steps for preparing the immobilization of calcium oxide into the ceramic mat.

A procedure for the immobilization of calcium oxide in a ceramic fiber was developed. Precipitated nano-particulate calcium carbonate (PCC; Specialty Minerals, USA), with an average particle size=70 nm, surface was treated with stearic acid to enhance dispersibility. The PCC was dissolved in ethyl alcohol under mechanical stirring for 10 min and the resultant solution was treated by ultrasonication for another 10 min to reduce agglomeration, as seen in FIG. 1. The slurry was dropped on both sides of a dried alumina ceramic fiber mat (Cotronics, USA) or dried yttria ceramic fiber mat with a transfer pipette. The impregnated mat was dried at 100° C. for 30 min and subsequently sintered at 800° C. for 12 hours in air. During the sintering, the calcium carbonate decomposed into calcium oxide and an interconnected microstructure of the calcium oxide was formed between the ceramic fibers in the fabric, as observed by Scanning Electron Microscopy (SEM) and X-ray diffraction (XRD) analysis, seen in FIGS. 2 and 3(a)-(c), respectively. The content of calcium oxide in the fabricated mat was about 23 wt %. The observation focused on the structural changes over the cyclic reactions. The composition of the sample was investigated by XRD experiments to confirm the conversion of calcium oxide into calcium carbonate during carbonation and the regeneration of calcium oxide after calcination.

Figure 4:
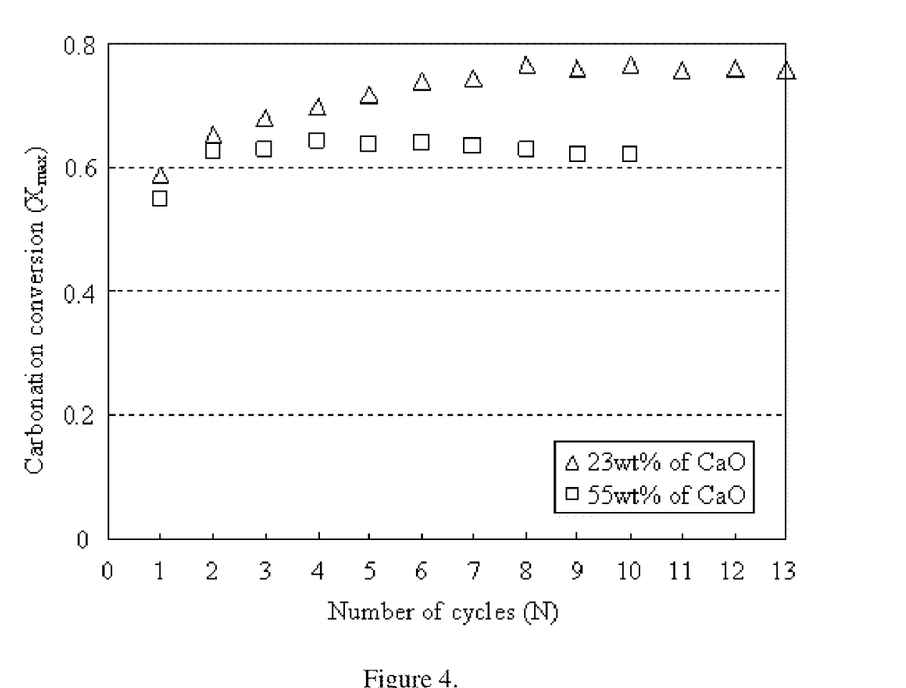
FIG. 4 is a graph depicting the maximum conversions of carbonation reaction of two samples loaded different calcium oxide contents, 23 wt % and 55 wt %, with the number of cycles.

The absolute capacity of carbon dioxide capture based on the total sample weight is not high due to the low calcium oxide content in the samples, about 23 wt %. Repeating the impregnation step in FIG. 1 produced a sample with higher calcium oxide content (55 wt %). The maximum cyclic carbonation conversions of prepared sample with 55 wt % calcium oxide were plotted with those of the sample with 23 wt % calcium oxide content in FIG. 4. The carbonation conversion of the sample with 55 wt % calcium oxide reached about 62% after 10 cycles. The absolute capacities of carbon dioxide capture of the sample with 55 wt % calcium oxide is almost double while the sample attained slightly lower conversion compared to the sample with 23 wt % calcium oxide content.

Figure 5:
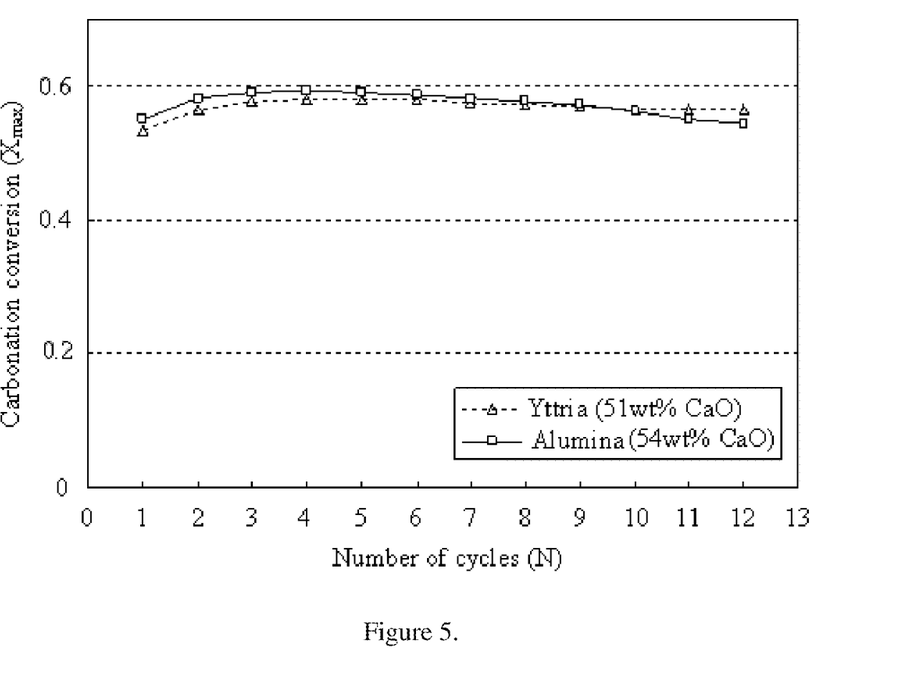
FIG. 5 is a graph depicting the cyclic maximum carbonation conversions of the samples using yttria and alumina as a substrate under the severe calcination condition at 850° C. and 20 wt % $CO_2$.

High temperature conditions and presence of $CO_2$ during the calcination reaction are practical and preferable for carbon dioxide sequestration or utilization since higher concentration of carbon dioxide from carbonated absorbents can be obtained. Under this severe calcination condition, it was found that calcium oxide and alumina reacted to form $Ca_{12}Al_{14}O_{33}$ (Wu, S. F.; Li, Q. H.; Kim, J. N.; Yi, K. B. Properties of a nano $CaO/Al_2O_3$ $CO_2$ sorbent. Ind. Eng. Chem. Res. 2008, 47, 180-184) and the inert material accounted for degradation of the sample. For this reason, the sample using a yttria fabric as a substrate in place of the alumina fabric was prepared and the maximum conversion trends under the severe calcination conditions, with 20% $CO_2$ at 850° C., are illustrated in FIG. 5. The maximum carbonation conversions of the sample on yttria fabric shows no sign of degradation over the 12 cycles while those of the sample using alumina drops by about eight percent after 12 cycles from the maximum of 59%.

The changes in the surface area during cyclic operation of the sample materials were measured by nitrogen adsorption in an AUTOSORB-1 instrument from Quantachrome Instruments.

Cyclic Reaction Experiment

Figure 3:
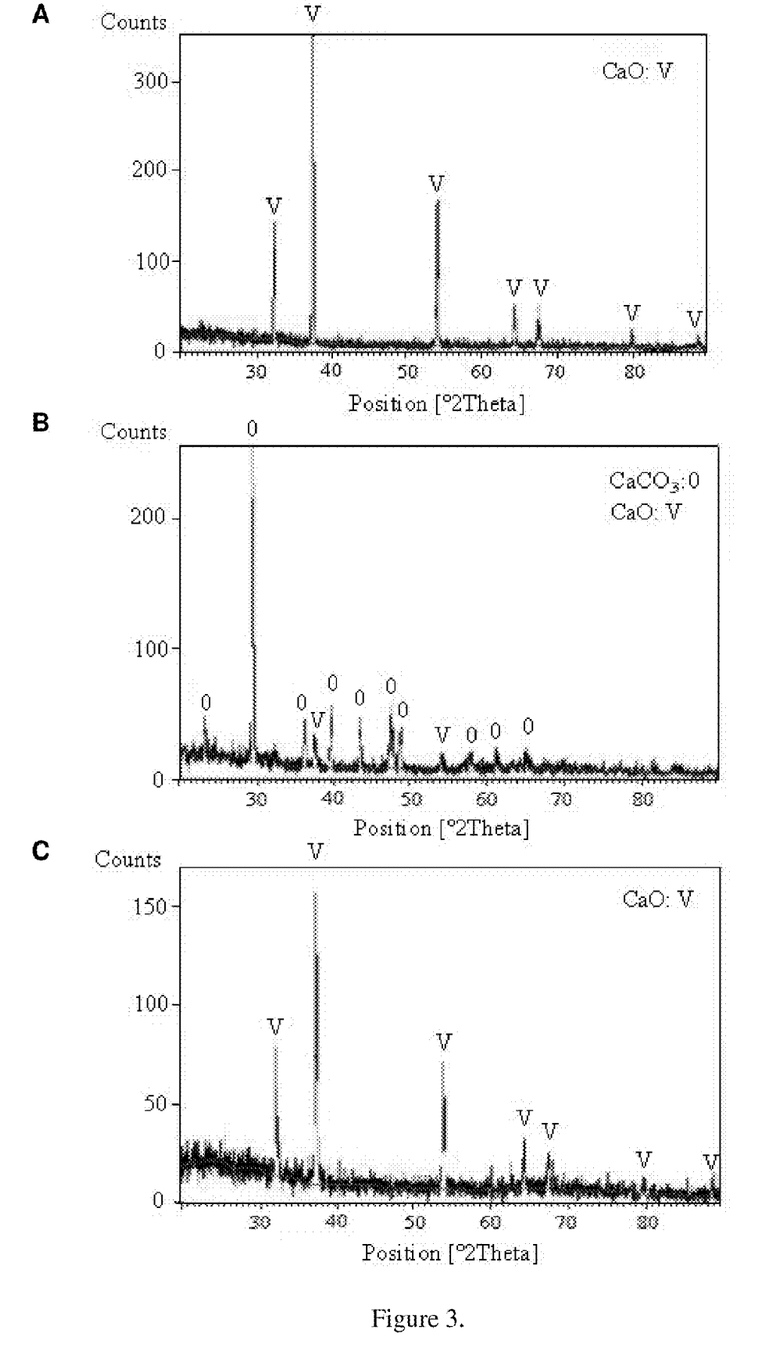
FIGS. 3(a) through (c) are x-ray diffraction plots of calcium oxide samples for (a) fresh, (b) after the $10^{th}$ carbonation cycle, and (c) after the $10^{th}$ calcination cycle (10 cycles).
Figure 6:
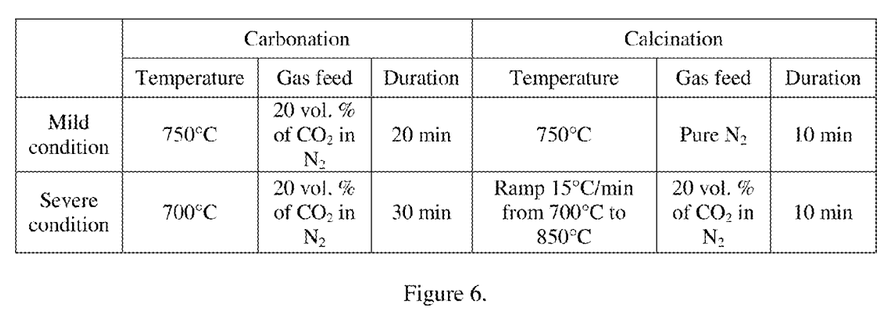
FIG. 6 is a table 1 summarizing the mild and severe calcination conditions used to test the calcium oxide sorbent of the present invention.
Figure 7:
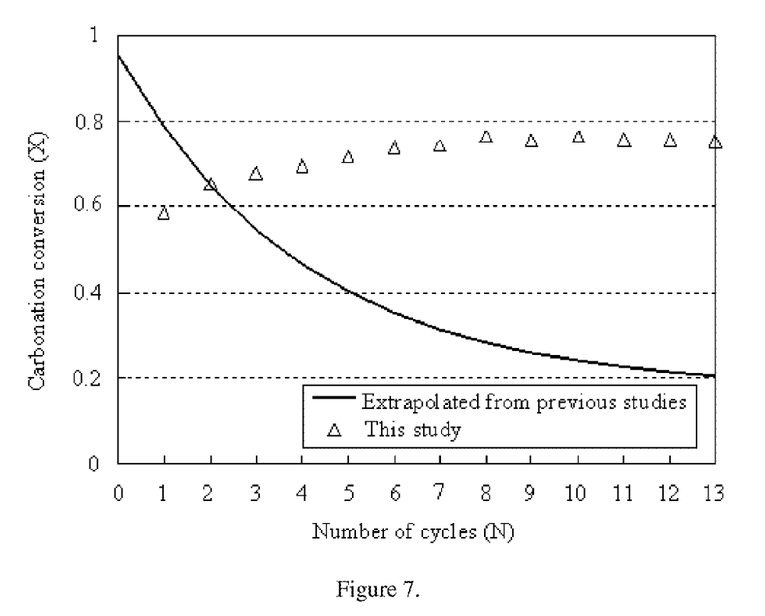
FIG. 7 is a graph depicting the maximum conversions of carbonation reaction with the number of cycles. The sorbent used was 23 wt % calcium oxide on alumina fibers.

The cyclic carbonation and calcination reactions were tracked by the associated weight changes in a Thermogravimetric (TG) Analyzer (Model: SDT-Q600, TA Instruments), performed in various conditions. The sintered calcium oxide mats were tested under isothermal conditions of 750° C. for both carbonation and calcination or different temperatures at 700° C. and 850° C. for carbonation and calcination. The samples were reacted with a 20 vol % of carbon dioxide in nitrogen for 20 minutes during carbonation and for the severe calcination, and pure nitrogen was supplied for 10 minutes during mild calcination. The reaction conditions for the mild and severe calcinations are summarized in FIG. 6. The concentration of carbon dioxide in the carbonation gas stream and the reaction times were selected considering the concentration in the effluents from most power plants and based on the preliminary test results. The degree of conversion of the sample showed no sign of decrease even after 13 cycles and it seemed to stabilize at about 75%, as seen in FIG. 3

The degree of conversion (X) of the calcium oxide in the cyclic carbonation-calcination reactions was defined as moles of calcium oxide reacted with carbon dioxide over moles of calcium oxide initially present as in the following equation:

$$X = \frac{n \text{ (calcium oxide reacted with } CO_2)}{n \text{ (initial calcium oxide)}} \quad (3)$$

The moles of calcium oxide reacted with carbon dioxide was calculated using the weight change of the sample measured by the TG analyzer. The maximum conversions ($X_{max}$) of the carbonation reaction were plotted as a function of the number of cycles (N) with an empirical curve fit of the experimental test data for various types of calcium oxide in different conditions from the previous studies, seen in FIG. 4. The conversion in the fitted curve from the literature data (Abanades, J. C.; Alvarez, D. Conversion limits in the reaction of $CO_2$ with lime. Energy & Fuels 2003, 17, 308-315) dropped steeply with the number of cycles. On the other hand, the conversion of the sample in this work gradually increased from an initial value of 58% to about 75% after a few cycles, where the conversion remained stable. Consequently, the maximum carbonation conversion after 13 cycles was about 75% for the sample in this study, whereas the value for the curve based on the literature data is about 20%.

Results and Discussion

Figure 2:
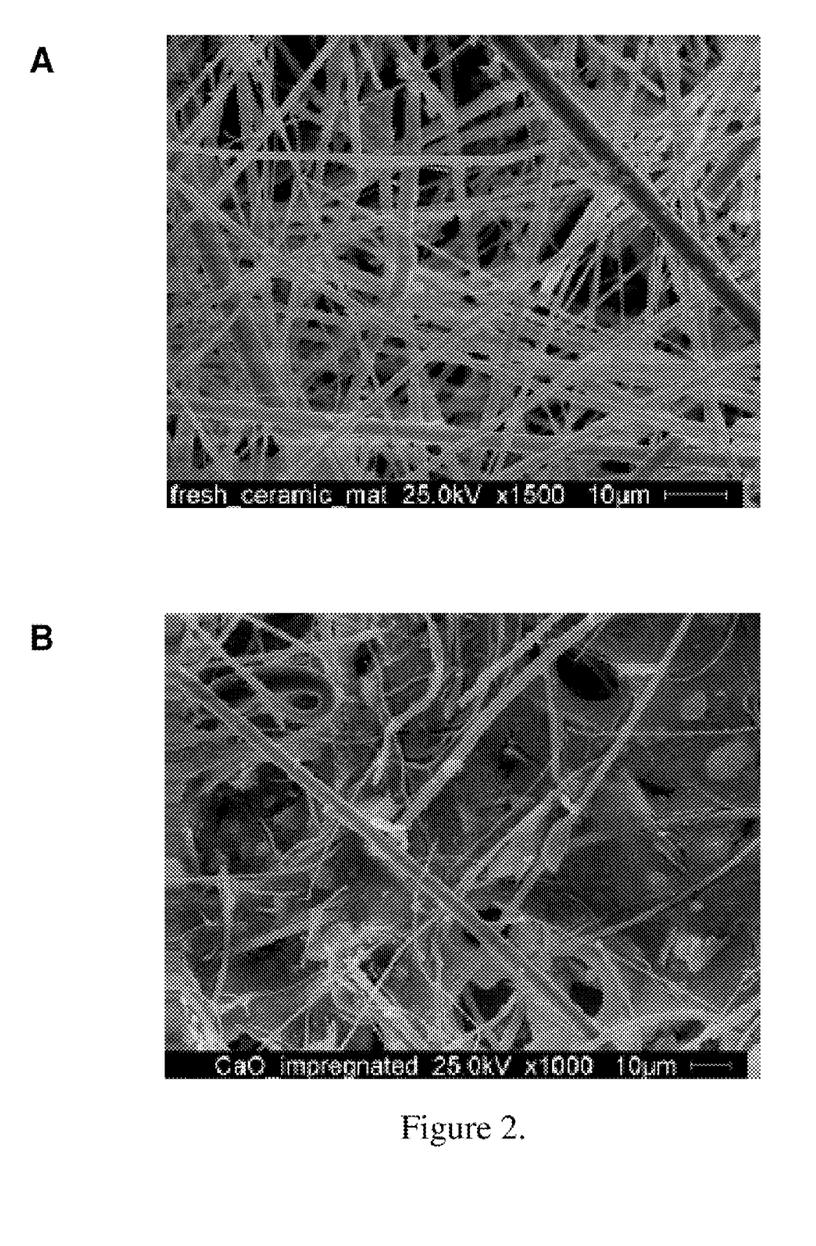
Figure 8:
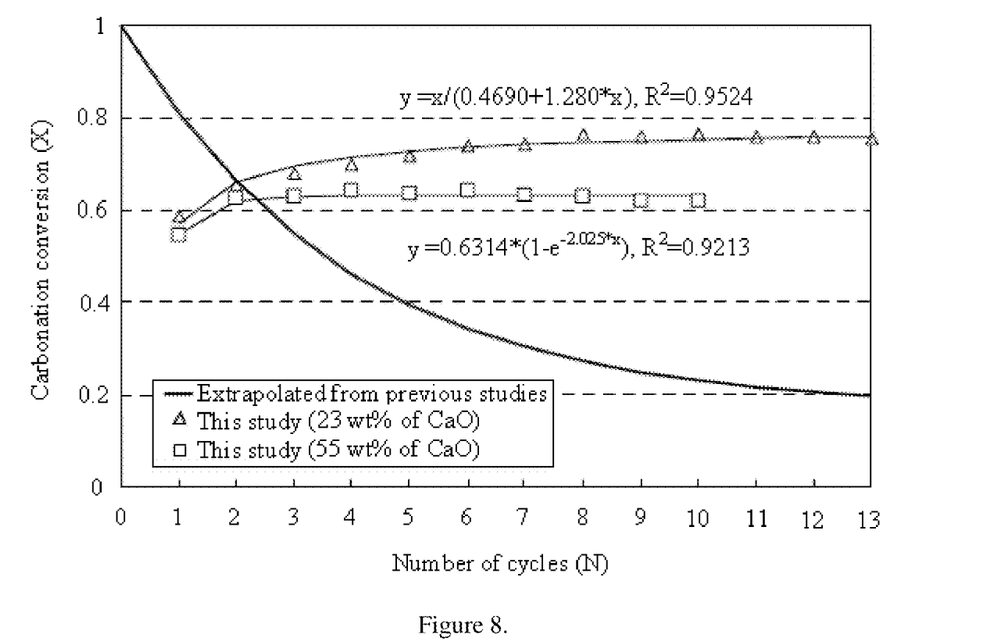
FIG. 8 is a graph depicting the maximum conversion of carbonation reaction with the number of cycles. Sorbent percentages of calcium oxide on alumina fibers were tested as indicated.

The content of calcium oxide in the fabric increased in proportion to the number of the impregnation steps, as discussed above. Two samples with different calcium oxide contents, 23 wt % and 55 wt %, in the alumina or yttria fabric, were prepared. The structure of the impregnated mat was examined under SEM, as seen in FIG. 2. The original alumina mat consists of micron sized alumina fibers which have a diameter of about 2 to 5 μm, seen in FIG. 2a. It was observed that calcium oxide particles are supported by the alumina fibers and interconnected microstructures of the calcium oxide were formed between the alumina fibers in the mat as shown in FIG. 2b. Some threads are exposed, while most others are buried by the calcium oxide particulate aggregates. The maximum carbonation conversions of the samples under the mild condition were plotted, seen in FIG. 8, loaded with the calcium oxide content of 23 wt % and 55 wt %, respectively. The initial maximum carbonation conversions were comparatively low, but the value increased and maintained at the same level. The sample with 23 wt % calcium oxide content attained about 75% carbonation conversion after 13 carbonation-calcination cycles and the carbonation conversion of the sample with 55 wt % calcium oxide reached about 62% after 10 cycles. The sample with 55 wt % calcium oxide maintained a cyclic conversion of 62% over 10 carbonation-calcination cycles. It is possible that the lower conversion of the sample with higher calcium oxide content is caused by higher diffusion resistance in the absorbent. An empirical curve fit of the experimental test data for various types of calcium oxide under different conditions was determined by Abanades (Abanades, J. C.; Alvarez, D. Conversion limits in the reaction of CO2 with lime. Energy & Fuels 2003, 17, 308-315). The curve fit equation is given in Eq. 4 which is also reproduced as a solid line in FIG. 8 without actual experimental data points to compare these results with previous studies in the literature (Shimizu, T.; Hirama, T.; Hosoda, H.; Kitano, K.; Inagaki, M.; Tejima, K. A twin fluid-bed reactor for removal of CO2 from combustion processes. Trans. I Chem E 1999, 77 (Part A), 62-68; Barker, R. The reversibility of the reaction CaCO3=CaO+CO2. J. Appl. Chem. Biotechnol 1973, 23, 733-742 Curran, G. P.; Fink, C. E.; Gorin, E. Carbon dioxide-acceptor gasification process: studies of acceptor properties. Adv. Chem. Ser. 1967, 69, 141-165; Aihara, M.; Nagai, T.; Matsushita, J.; Negishi, Y.; Ohya, H. Development of porous solid reactant for thermal-energy storage and temperature upgrade using carbonation/decarbonation reaction. Applied Energy 2001, 69, 225-238; Silaban, A.; Harrison, D. P. High temperature capture of carbon dioxide: Characteristics of the reversible reaction between CaO(s) and CO2 (g). Chem. Eng. Commun. 1995, 137, 177-190). It is possible to tell that the lower conversion of the sample with higher contents of calcium oxide is caused by more diffusion resistance in the absorbent due to the increased calcium oxide content.

Figure 9:
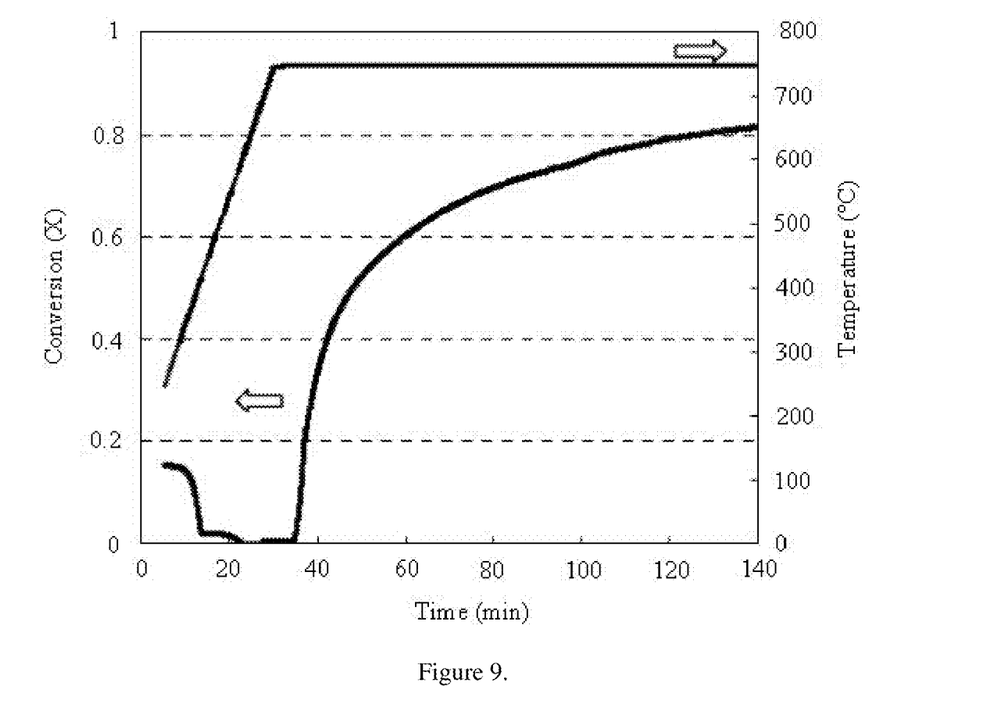
FIG. 9 is a graph depicting the conversion and reaction temperatures for carbonation conversion of the 23 wt % calcium oxide on alumina fiber sample.

Conversion and reaction temperatures of the carbonation reaction for the calcium oxide fabric sample are plotted in FIG. 9. There was a 2.5% weight loss as the furnace was heated at a rate of 20° C./min to 750° C. under a pure nitrogen atmosphere. It was believed that the weight loss is possibly caused by the thermal decomposition of calcium hydroxide that might have formed by the reaction between calcium oxide and moisture. Once the temperature reached 750° C., 20 vol % $CO_2$ in nitrogen was delivered for the carbonation reaction. Like other trends in the literature, the carbonation reaction was very rapid in the initial stage while it decreased as time passed since the calcium oxide particles are covered with a layer of calcium carbonate, which imposes a limitation on the reactant gas diffusion (Bhatia, S. K.; Perlmutter, D. D. Effect of the product layer on the kinetics of the CO2-lime reaction. AIChE Journal 1983, 29, 79-86; Mess, D.; Sarofim, A. F.; Longwell, J. P. Product layer diffusion during the reaction of calcium oxide with carbon dioxide. Energy & Fuels 1999, 13, 999-1005). 60% conversion was attained approximately within 20 minutes while 80% conversion took two hours. Therefore 20 minute duration for the carbonation reaction was chosen for the cyclic experiment in consideration of the effectiveness.

Figure 10:
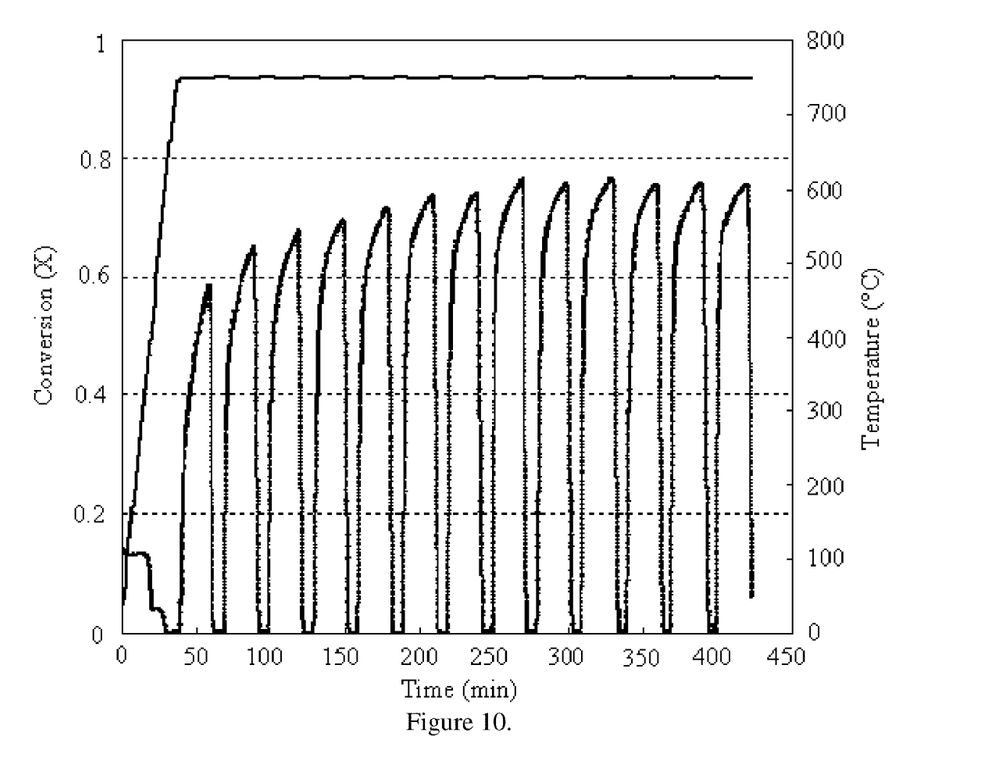
FIG. 10 is a graph depicting the conversion and temperature profiles for cyclic carbonation/calcination reactions for 23 wt % calcium oxide on alumina fiber.

The conversion and temperature profiles for cyclic carbonation/calcination reactions were illustrated in FIG. 10. The conversion began at comparatively low level (about 59%), but the value gradually increased in the first couple of cycles and seemed to stabilize at about 75%. Based on the change of the surface area measured by nitrogen adsorption, the surface area of a sample after ten cycle was 16.2 m$^2$/g while the fresh sample began with a comparatively low surface area (9.2 m$^2$/g). Hence, the increase of the conversion in the early stage is possibly due to the increase in the surface area by the initial structural transformation that was caused by the cyclic volume changes. Each profile consists of the first fast stage and the second sluggish stage of the carbonation reaction as seen in FIG. 10. It can be observed that the temperature fluctuated very slightly since the carbonation and calcination reactions are exothermic and endothermic, respectively. The calcination reactions were completed within at most 5 minutes. The degree of conversion of the sample was maintained at the same level after several cycles and showed no signs of decrease even after 13 cycles.

Figure 11:
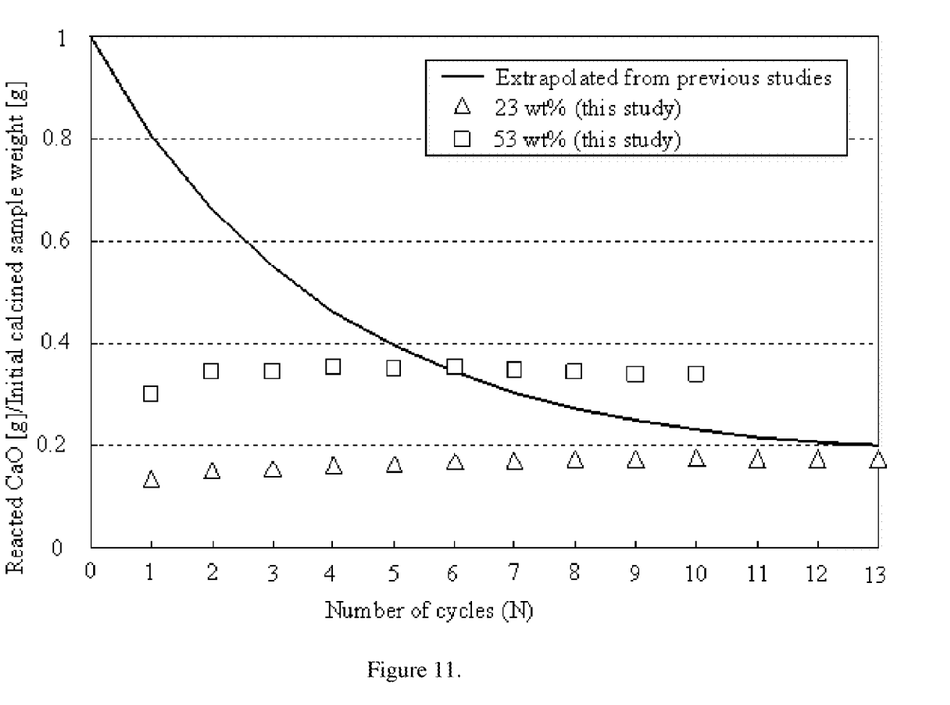
FIG. 11 is a graph depicting the maximum amounts of reacted calcium oxide in the carbonation reactions based on initial sample weight with the number of cycles

The maximum amounts of reacted calcium oxide in the two samples were measured against those in pure calcium oxide forms from previous research, depicted in FIG. 11. An empirical curve fit of the experimental test data for various types of calcium oxide under different conditions from previous studies, the equation is given in (4) below, was reproduced without actual experimental data points in order to compare the current results with previous other studies. (Barker, R. The reversibility of the reaction $CaCO_3=CaO+CO_2$. J. Appl. Chem. Biotechnol 1973, 23, 733-742; Curran, G. P.; et al. Carbon dioxide-acceptor gasification process: studies of acceptor properties. Adv. Chem. Ser. 1967, 69, 141-165; Aihara, M.; et al. Development of porous solid reactant for thermal-energy storage and temperature upgrade using carbonation/decarbonation reaction. Applied Energy 2001, 69, 225-238; Shimizu, T.; et al. A twin fluid-bed reactor for removal of $CO_2$ from combustion processes. Trans. IChemE 1999, 77 (Part A), 62-68; Silaban, A.; Harrison, D. P. High temperature capture of carbon dioxide: Characteristics of the reversible reaction between CaO(s) and $CO_2$ (g). Chem. Eng. Commun. 1995, 137, 177-190) were developed (Abanades, J. C.; Alvarez, D. Conversion limits in the reaction of $CO_2$ with lime. Energy & Fuels 2003, 17, 308-315; Abanades, J. C. The maximum capture efficiency of $CO_2$ using a carbonation/calcination cycle of $CaO/CaCO_3$. Chemical Engineering Journal 2002, 90, 303-306).

$$X = 0.83 \times 0.77^N + 0.17 \qquad (4)$$

The conversion in the fitted curve from literature data dropped steeply with the number of cycles. On the other hand, the conversion of the sample in this work gradually increased for the first few cycles, after which it remained stable. The maximum carbonation conversion for the curve based on the literature data is about 20% after 13 cycles. The amount of carbon dioxide capture of the sample with 23 wt % calcium oxide is low due to low calcium oxide content in samples but the value of the sample is also expected to excel the fitted curve approximately after the 25$^{th}$ cycle at this pace. Based on the absolute capacity of carbon dioxide capture, the 55 wt % CaO sample outperformed the conventional pure calcium carbonate in the previous studies after the sixth cycle.

Figure 12:
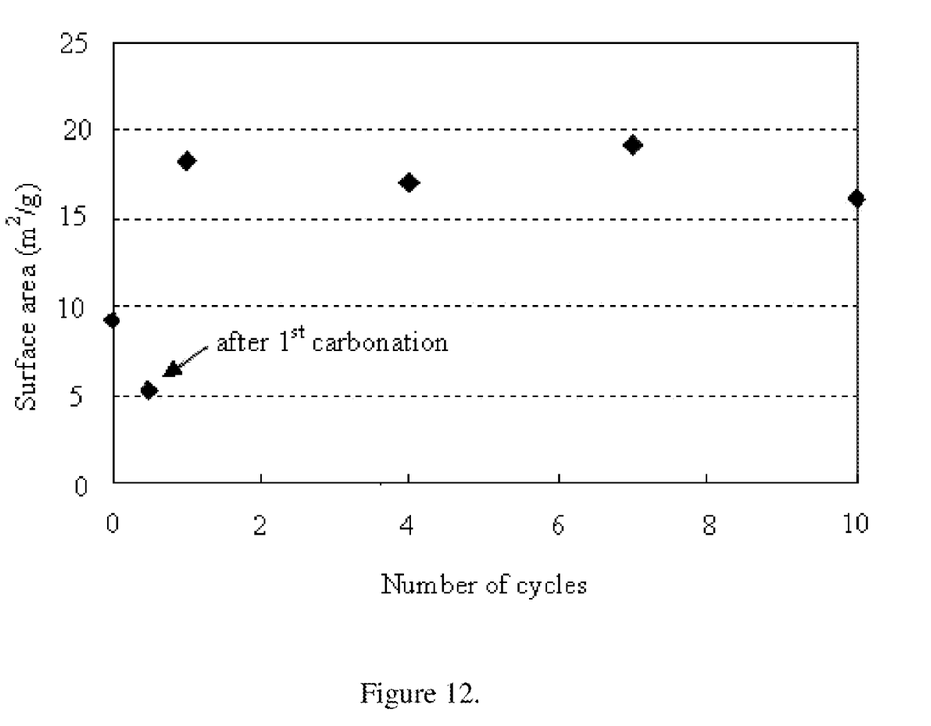
FIG. 12 is a graph depicting the change of surface area in the sample over the several cyclic reactions.
Figure 13:
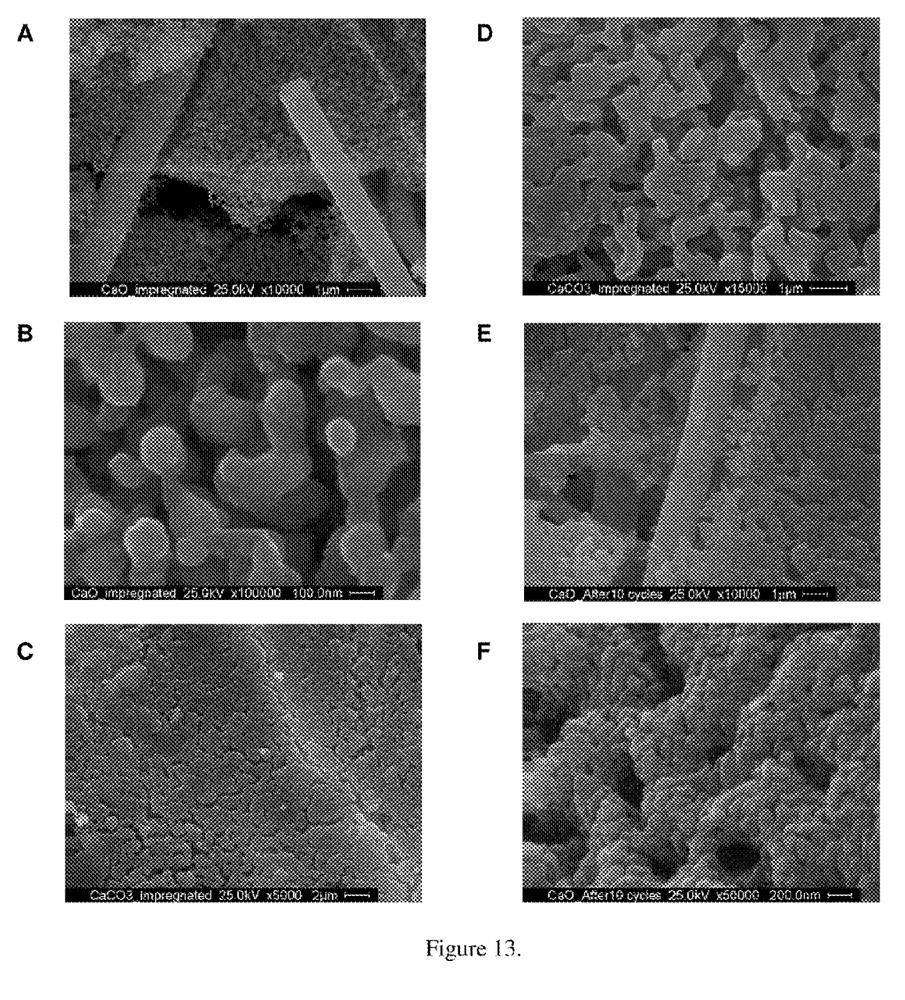
FIGS. 13(a) through (f) are scanning electron microscope (SEM) images for the (a and b) fresh, (c and d) after $10^{th}$ carbonation, and (e and f) after $10^{th}$ calcination (10 cycles)

The surface areas of the sample with 23 wt % calcium oxide over several cyclic reactions are shown in FIG. 12. Considering the molar volumes of calcium oxide and calcium carbonate, it was expected that the surface area would diminish during the carbonation reaction and would be regenerated after the calcination reaction. The fresh sample began with a comparatively low surface area (9.2 m$^2$/g). It decreased to 5.3 (m$^2$/g) after carbonation due to the volume expansion of the particles as expected, but it increased drastically to about 18.3 m$^2$/g after one cycle. After that, values of the surface area of the sample after calcination remained in the range of 16-19 m$^2$/g. Based on the figure, it can be assumed that the big jump of the surface area in the initial stage was caused by the permanent partial structural breakage and void generation owing to the volume contraction from carbonate to oxide form.

The X-ray diffraction patterns of the sample (23 wt % CaO) for (a) fresh sintered (b) after the 10$^{th}$ carbonation and (c) after the 10$^{th}$ calcination indicate that the samples after sintering and the 10$^{th}$ calcination contain only calcium oxide while calcium carbonate accounts for the major compound along with small quantities of unreacted calcium oxide after the 10$^{th}$ carbonation, seen in FIGS. 3(a)-(c). Moreover, magnified images of the freshly sintered sample (23 wt % CaO) and the sample after the 10$^{th}$ carbonation and calcination reactions indicate that the calcium oxide particles which have a diameter of about 150 nm, are dispersed in the alumina fabric, as seen in FIGS. 3(a)-(f). After the 10$^{th}$ carbonation reaction (c and d), the structure is comparatively closed-packed with larger particles possibly due to the volume expansion of the particles. The structure after the 10$^{th}$ calcination seems to consist of more interconnected agglomerates of the calcium oxide particles with a stabilized high surface area in the images (e) and (f).

The severe condition for calcination reaction is preferable to carbon dioxide sequestration or utilization since higher concentrations of carbon dioxide from carbonated absorbents can be obtained. However, it was observed that the severe calcination under higher temperature and presence of carbon dioxide pulled down the performance of the calcium oxide absorbents significantly (Grasa, G.; et al. Comparison of CaO-based synthetic $CO_2$ sorbents under realistic calcination conditions. Energy & Fuels 2007, 21, 3560-3562). Under these high temperatures, it was proved that the mixture of calcium oxide and alumina react to form a new compound, $Ca_{12}Al_{14}O_{33}$. For the reason, yttria fabric was also introduced as a substrate along with alumina fabric. The cyclic carbonation-calcination experiments of the two samples using different materials of fabric were conducted under the severe calcination condition in FIG. 6 and the maximum conversion trends of the samples are illustrated in FIG. 5. As shown in the figures, the maximum carbonation conversions (about 55%) of the sample using yttria fabric as a substrate showed no sign of degradation over the 12 cycles while those of the sample using alumina dropped by about eight percents from the maximum value (about 59%) after 12 cycles. Judging from these experiment results and the previous literature, it was concluded that the yttria fabric is superior to the alumina fabric as a substrate for calcium oxide absorbent at the severe condition due to the possibility of the formation of $Ca_{12}Al_{14}O_{33}$ by the reaction between calcium oxide and alumina under the high temperature over than 800° C.

CONCLUSIONS

A calcium oxide absorbent was dispersed and immobilized in ceramic-based fibrous fabric using precipitated calcium carbonate (PCC) as a starting material, via an immobilization process. The procedure is comparatively straightforward and inexpensive and the materials are readily available. It was observed that the calcium oxide particles were dispersed and immobilized on the fibrous ceramic mat. The fraction of calcium oxide impregnated in the mat was 23 wt % and 55 wt %, respectively. The samples with 23 wt % and 55 wt % content of calcium oxide on the ceramic mat achieved continuous cyclic carbonation conversions of about 75% and 62% over 13 and 10 carbonation-calcination cycles, respectively. The introduction of the fibrous alumina or yttria substrate proved to be effective in minimizing the pore closure and particle sintering due to cyclic volume change and preserving the active surface area based on the test results of the cyclic carbonation and calcination reactions. Under the more severe calcination condition at 850° C. and 20 wt % $CO_2$, the cyclic reactivity of the calcium oxide sample using yttria fabric was maintained at the same level through the 12 cycles.

In the preceding specification, all documents, acts, or information disclosed does not constitute an admission that the document, act, or information of any combination thereof was publicly available, known to the public, part of the general knowledge in the art, or was known to be relevant to solve any problem at the time of priority.

The disclosures of all publications cited above are expressly incorporated herein by reference, each in its entirety, to the same extent as if each were incorporated by reference individually.

While there has been described and illustrated specific embodiments of a method of treating neurodegenerative disease, it will be apparent to those skilled in the art that variations and modifications are possible without deviating from the broad spirit and principle of the present invention. It is also to be understood that the following claims are intended to cover all of the generic and specific features of the invention herein described, and all statements of the scope of the invention which, as a matter of language, might be said to fall therebetween.

What is claimed is:

1. A method of immobilizing calcium oxide on ceramic fiber, comprising the steps of:
   dissolving calcium carbonate in ethyl alcohol;
   ultrasonicating the dissolved calcium carbonate;
   applying the slurry calcium carbonate on ceramic fiber;
   drying the slurry; and
   sintering the dried slurry.

2. The method of claim 1, wherein the calcium carbonate is precipitated calcium carbonate.

3. The method of claim 1, wherein the calcium carbonate is dissolved in ethyl alcohol under mechanical stirring for 10 minutes.

4. The method of claim 1, further comprising treating the calcium carbonate with stearic acid prior to dissolving the calcium carbonate.

5. The method of claim 1, wherein the dissolved calcium carbonate is ultrasonicated for 10 minutes.

6. The method of claim 1, wherein the slurry is dried at 100° C. for 30 minutes in air.

7. The method of claim 1, wherein the dried slurry is sintered at 800° C. for 12 hours in air.

8. The method of claim 1, wherein the ceramic fiber is alumina ceramic fiber or yttria ceramic fiber.

9. The method of claim 1, further comprising:
   applying additional slurry calcium carbonate on the dried slurry-ceramic fiber before sintering; and
   drying the additional slurry.

10. A particulate sequestering material, comprising
    an absorbing material further comprising of at least calcium oxide; and
    ceramic fiber, wherein the absorbing material is impregnated and sintered into the ceramic fiber.

11. The particulate sequestering material of claim 10, wherein the absorbing material comprises calcium oxide amounts selected from the group consisting of 55 weight percent and 23 weight percent.

12. The particulate sequestering material of claim 10, wherein the ceramic fiber is alumina ceramic fiber or yttria ceramic fiber.

13. The particulate sequestering material of claim 12, wherein the alumina ceramic fiber consists of alumina fibers with a diameter within the range of 2 to 5 µm.

14. The particulate sequestering material of claim 10, wherein the surface area of the absorbing material is within the range of 9.2 to 19 $m^2/g$.

15. The particulate sequestering material of claim 10, wherein the absorbing material comprises interconnected microstructures of calcium oxide particles between the ceramic fibers.

16. A method of sequestering carbon dioxide, comprising the steps of:
    providing an absorbent material, further comprising:
       an absorbing material further comprising of at least calcium carbonate;
       ceramic fiber, wherein the absorbing material is impregnated and sintered into the ceramic fiber;
    exposing the absorbent material to a gas comprising at least carbon dioxide.

17. The method of claim 16, wherein the gas comprises 20 vol % carbon dioxide in nitrogen.

18. The method of claim 16, wherein the absorbent material is exposed to the gas at between 700-750° C.

19. The method of claim 16, wherein the calcium carbonate is precipitated calcium carbonate.

20. The method of claim 16, wherein the absorbent material is exposed to the gas for between 20 minutes and 2 hours.

21. The method of claim 16, further comprising recycling the absorbent material, comprising the step of
    exposing the absorbent material to a recycling gas comprising at least nitrogen at between 700-850° C.

22. The method of claim 21, wherein the recycling gas is selected from the group consisting of 20% carbon dioxide in nitrogen and pure nitrogen.

23. The method of claim 21, wherein the absorbent material is exposed to the recycling gas for 5 minutes.

* * * * *